United States Patent
Tsunekawa

(10) Patent No.: US 9,910,629 B2
(45) Date of Patent: Mar. 6, 2018

(54) IMAGE OUTPUT SYSTEM, IMAGE PROCESSING APPARATUS, IMAGE OUTPUT APPARATUS AND METHODS THEREFOR

(71) Applicant: CANON KABUSHIKI KAISHA, Tokyo (JP)

(72) Inventor: Kiyohiro Tsunekawa, Tsukubamirai (JP)

(73) Assignee: Canon Kabushiki Kaisha, Tokyo (JP)

( * ) Notice: Subject to any disclaimer, the term of this patent is extended or adjusted under 35 U.S.C. 154(b) by 117 days.

(21) Appl. No.: 15/078,478

(22) Filed: Mar. 23, 2016

(65) Prior Publication Data

US 2016/0299730 A1    Oct. 13, 2016

(30) Foreign Application Priority Data

Apr. 9, 2015    (JP) ................. 2015-079997

(51) Int. Cl.
*H04N 1/00* (2006.01)
*G06F 3/12* (2006.01)
*G06F 15/16* (2006.01)

(52) U.S. Cl.
CPC .......... *G06F 3/1247* (2013.01); *G06F 3/1215* (2013.01); *G06F 3/1248* (2013.01);
(Continued)

(58) Field of Classification Search
CPC .... G06F 3/1238; G06F 3/1244; G06F 3/1245; G06F 3/1247; G06F 3/1248; G06F 3/1215; G06F 3/1211; G06F 3/1288; G06F 3/1289; G06F 3/129; G06F 3/1293; G06F 3/1296; G06F 3/1297; G06F 3/1298; H04N 1/00244; H04N 1/0023; H04N 1/00233; H04N 1/00228; H04N 1/00148
(Continued)

(56) References Cited

U.S. PATENT DOCUMENTS 7,505,156 B2    3/2009    Tsunekawa
8,422,046 B2    4/2013    Tsunekawa
(Continued)

FOREIGN PATENT DOCUMENTS

JP    2010-181948    8/2010

*Primary Examiner* — Chad Dickerson
(74) *Attorney, Agent, or Firm* — Fitzpatrick, Cella, Harper & Scinto

(57) ABSTRACT

An image processing apparatus stores received print data and requests a conversion server to convert the print data. In response, the conversion server converts the print data into a predetermined format and transmits reference information indicating a location of the print data after conversion to the image processing apparatus. An image output apparatus transmits its own apparatus configuration information and a print request to the image processing apparatus. In response, the image processing apparatus outputs either of the print data and the reference information to the image output apparatus, based on the apparatus configuration information. The image output apparatus acquires, when the reference information is received, the print data after conversion from the conversion server and performs printing, based on the reference information, and performs, when the print data is received, printing based on the received print data.

27 Claims, 10 Drawing Sheets

(52) U.S. Cl.
 CPC ....... *G06F 3/1288* (2013.01); *H04N 1/00244* (2013.01); *H04N 2201/0094* (2013.01)

(58) Field of Classification Search
 USPC ....... 358/1.11–1.18, 400–404, 1.9, 2.1, 3.22, 358/3.23, 3.24; 709/201–203, 212–219; 710/15–19, 38; 718/1, 100, 101, 102, 718/104, 106
 See application file for complete search history.

(56) References Cited

U.S. PATENT DOCUMENTS

| | | |
|---|---|---|
| 8,913,278 B2 | 12/2014 | Tsunekawa |
| 2003/0231338 A1* | 12/2003 | Haga .................. H04N 1/00002 358/1.15 |
| 2008/0137126 A1* | 6/2008 | Yoshida ................ G06K 15/02 358/1.14 |
| 2010/0053659 A1* | 3/2010 | Hattori ............... H04N 1/00233 358/1.13 |
| 2010/0115608 A1* | 5/2010 | Uchikawa ............... G06F 21/84 726/18 |
| 2013/0163017 A1* | 6/2013 | Matsuda ............. H04N 1/0023 358/1.13 |
| 2013/0242334 A1* | 9/2013 | Ichida .................. G06F 3/1222 358/1.14 |
| 2014/0240774 A1* | 8/2014 | Suzuki ................. G06F 3/1236 358/1.15 |

* cited by examiner

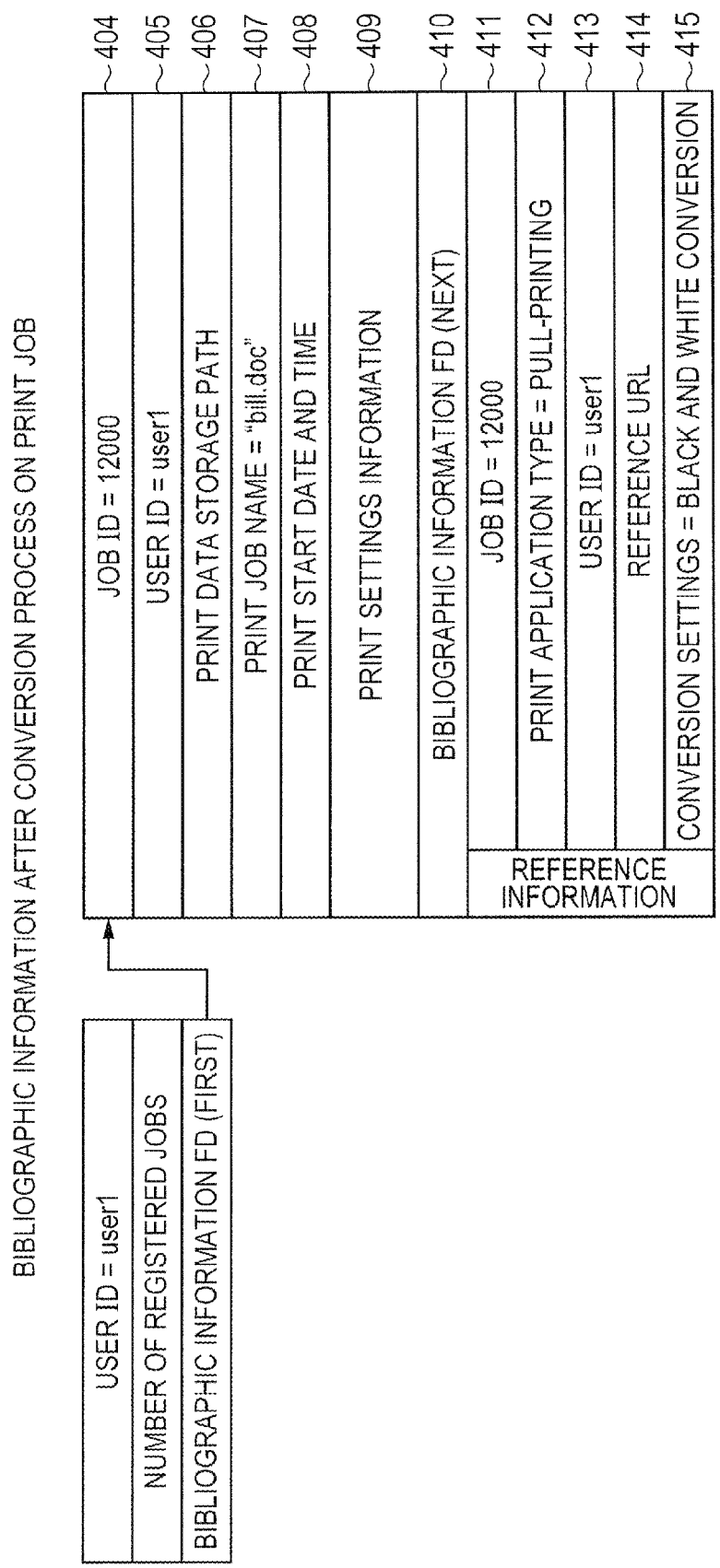

IMAGE OUTPUT SYSTEM, IMAGE PROCESSING APPARATUS, IMAGE OUTPUT APPARATUS AND METHODS THEREFOR

BACKGROUND OF THE INVENTION

Field of the Invention

The present invention relates to an image output system including an image output apparatus that generates and prints a page image corresponding to a print job input from an external apparatus. In particular, the present invention relates to an image output system in which: the processing target is a page description language (hereinafter, referred to as "PDL") as a print job; and a user selects an arbitrary image output apparatus and performs printing in a network environment in which a plurality of image output apparatuses is connected.

Description of the Related Art

In recent years, authentication printing has become popular in printing using an image output apparatus such as a printer and a multifunction peripheral (hereinafter, referred to as "MFP"). In the authentication printing, for the purpose of preventing forgetting to collect printed materials and preventing leakage of classified documents, images are output after user authentication is performed using an IC card in the image output apparatus. Specifically, in the authentication printing, first, a print job to which user information for identifying a user is added is stored (submitted) to an authentication printing server. Subsequently, user information included in the non-contact IC card is read by a card reader connected to the image output apparatus, a list of print jobs that match the user information is acquired from the authentication printing server, and the list is displayed on a display unit on an operation panel. Then, a desired print job is selected from the displayed list, and an output instruction is given. In response, the image output apparatus receives the selected print job from the authentication printing server, analyzes the print job, and outputs a page image onto recording paper. Here, examples of the user information included in the print job include a user's login ID to a host PC (hereinafter, referred to as "PC") that has generated the print job. In this way, in the authentication printing, the user is present at the scene of print-out processing, and hence forgetting to collect printed materials and leakage of classified documents can be prevented.

However, an image output apparatus to be selected cannot be identified at the time at which a print job is generated by a printer driver running on a PC, and hence it is necessary to unify a plurality of image output apparatuses into an apparatus type with the same apparatus settings, in order to enable printing whichever of the image output apparatuses is selected. To deal with this, Japanese Patent Application Laid-Open No. 2010-181948 proposes "location-free printing", that is, authentication printing having a configuration in which a print server performs conversion into print data printable by an image formation apparatus based on apparatus information received from the image formation apparatus.

Moreover, the following use example is conceivable as a configuration example of image output apparatuses having different apparatus settings. That is, in the case of establishing an authentication printing environment mixedly including a color machine and a black and white machine, a print job is once submitted with black and white output being set, and the print settings are then desired to be changed to color output. In this example, the initial value of the color mode in a printer driver may be set to a value for black and white output, and a print job may be submitted with the color mode being left unchanged. Further, the color mode may not be specified at the time of submission, and the color mode may be specified by selecting an image output apparatus that performs user authentication.

In an authentication printing system described in Japanese Patent Application Laid-Open No. 2010-181948, a print file is converted into print data after a print output request is received from the image formation apparatus. This conversion process takes time depending on the number of pages of the print file and the complexity of the contents thereof. Accordingly, there is a problem that the responsiveness from the issuing of a print output request by a user to the start of print output may become lower and that the comfort is impaired.

Moreover, the print server performs processes as a bibliographic server, such as a process of receiving a print file transmitted from a PC and a process of listing target print files in response to a print output request including user information from a MFP, in addition to the process of generating the print data. Hence, in a network environment in which a large number of PCs, printers and MFPs are connected, processing load concentration occurs, so that the responsiveness may become further lower. Note that Japanese Patent Application Laid-Open No. 2010-181948 does not describe a method of specifying various print settings (an output paper size, a paper feed tray and layout settings for N-up printing) made on UI screens of a printer driver and application software.

Meanwhile, in the case where the color mode at the time of submission is set to black and white output, a printer driver generates PDL data by converting chromatic colors into grayscale, and hence the print settings cannot be changed to color output at the time of printing. To deal with this, it is conceivable to generate print data including contents of chromatic colors regardless of the color mode set at the time of submission and perform color conversion by an image output apparatus. In this case, however, the size of PDL data increases particularly in the case of a print job including a large amount of image data. Moreover, for example, a compression format suitable for color output, such as JPEG, may be applied to a photographic image, and this compression format may be a data format redundant for a black and white machine. Hence, there is a problem that, depending on the contents of print data, the processing load increases in printing using a black and white machine and that the print speed decreases.

SUMMARY OF THE INVENTION

In order to solve the above-mentioned problems, the present invention provides an image output system in which an image processing apparatus, an image output apparatus and a conversion server for data conversion are connected to one another via a network. The image processing apparatus comprises: a storage unit configured to store print data received from an external apparatus via the network; and a conversion control unit configured to request the conversion server to perform a conversion process on the print data, the conversion server comprises: a conversion unit configured to perform a conversion process of converting the print data into a predetermined format in response to the request from the image processing apparatus; a reference information generation unit configured to generate reference information indicating a location of the print data after conversion by the conversion unit; and a reference information transmission unit configured to transmit the reference information to the image processing apparatus as a response to the request from the image processing apparatus, and the image output apparatus comprises: a print request unit configured to notify the image processing apparatus of apparatus configuration information on the image output apparatus and issue a print request to the image processing apparatus; and a print unit configured to perform a print process. The image processing apparatus further comprises a print request response unit configured to select either of the print data stored in the storage unit and the reference information received from the conversion server based on the apparatus configuration information, and output the selection result to the image output apparatus as a response to the print request from the image output apparatus. In the image output apparatus, when the reference information is received from the image processing apparatus, the print unit acquires the print data after conversion by the conversion unit from the conversion server and performs printing, based on the reference information, and, when the print data is received from the image processing apparatus, the print unit performs printing based on the print data.

Further features of the present invention will become apparent from the following description of exemplary embodiments with reference to the attached drawings.

BRIEF DESCRIPTION OF THE DRAWINGS

FIG. 4C is a diagram illustrating bibliographic information after a conversion process on print job.

DESCRIPTION OF THE EMBODIMENTS

Preferred embodiments of the present invention will now be described in detail in accordance with the accompanying drawings.

First Embodiment

System Configuration

Figure 1:
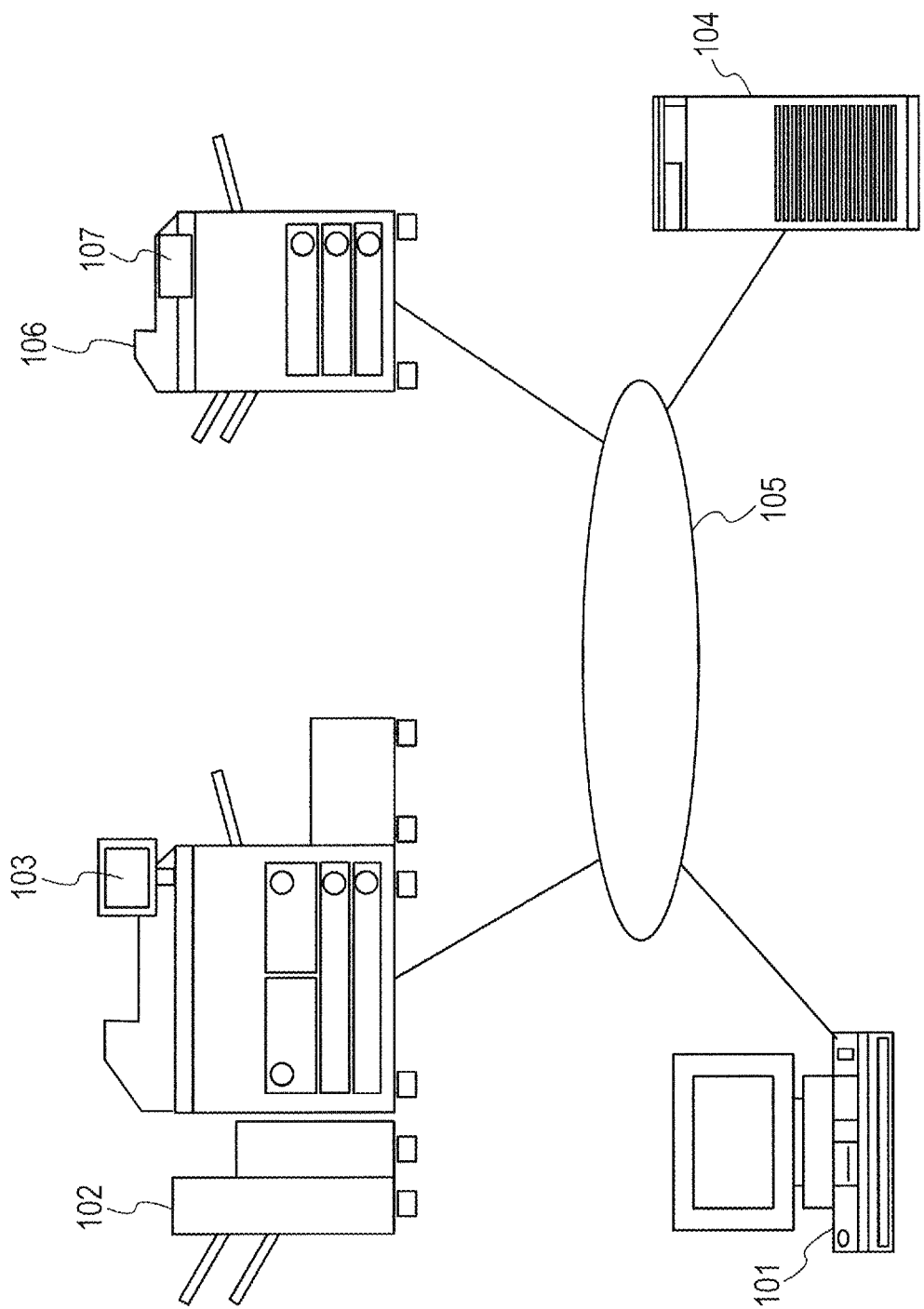
FIG. 1 is a diagram illustrating a connection example of an image processing system to which the present invention can be applied.

FIG. 1 illustrates a connection example of apparatuses constituting an image output system in the present embodiment. In this connection example, a computer (hereinafter, referred to as "PC") 101, image output apparatuses 102 and 106 and a conversion server 104 are connected to one another via a network 105. In FIG. 1, the image output apparatuses 102 and 106 are, for example, multifunction peripherals (MFPs) that respectively include display units 103 and 107 each including a LCD and form images on paper media according to known electrophotographic technology.

The image output apparatus (image processing apparatus) 102 functions as an authentication printing server. That is, the image output apparatus 102 has a server function for authentication printing, and outputs print job list information on a print job submitted by a user and the print job (PDL data), in response to a request from the image output apparatus 106 that functions as an authentication printing client. Specifically, in response to a print job list acquisition request including user information, the image output apparatus 102 outputs print job list information including bibliographic information (management information) on print jobs that match the specified user information among stored print jobs. Moreover, the image output apparatus 102 outputs a corresponding print job in response to a print request including user information, and deletes a print job in response to a deletion request.

The image output apparatus 102 also functions as an authentication printing client. The image output apparatus 102 can display a print job list that a user identified by IC card authentication submits to the image output apparatus 102, on the display unit 103, and can print a print job specified by a user's operation alone. Hereinafter, in the case where the image output apparatus 102 is distinguished as an authentication printing server, the image output apparatus 102 is expressed as a "bibliographic server". In the case where the image output apparatus 102 is distinguished as an image output apparatus that performs printing, the image output apparatus 102 is expressed as a "client". Here, the bibliographic server 102 manages received print jobs, and has an authentication server function of performing user authentication based on information read by an IC card reader connected to one of the bibliographic server 102 itself and the client 106, but the present invention is not limited to this configuration.

The PC 101 functions as a print data generation apparatus. That is, in response to a print instruction from application software, the PC 101 generates PDL data in which various print settings specified from a UI of a printer driver are reflected, adds information for identifying a user to the PDL data, and submits the PDL data as a print job to the bibliographic server 102. At the time of receiving the print job, the bibliographic server 102 outputs (transmits) the print job to the conversion server 104 to request print data conversion, and receives reference information as a conversion result. The details of this process are described later.

Note that, although the display units 103 and 107 in the present embodiment are described as touch-panel displays, the display units 103 and 107 also function as operation units for receiving an operation of a print environment menu and various instructions such as a print instruction and a deletion instruction. Moreover, although FIG. 1 illustrates a configuration in which one PC 101 and one client 106 are connected for the sake of simplicity, a plurality of the PCs 101 and a plurality of the clients 106 may be connected. Note that, although printing of print jobs is executed from the PC 101 as a general personal computer in the present embodiment, the present invention is not limited thereto, and printing of print jobs may be executed in response to outputs from a mobile terminal and a core system for processing various affairs concerning inventory management and financial operations.

<Hardware Configurations of Bibliographic Server 102 and Conversion Server 104>

Figure 2:
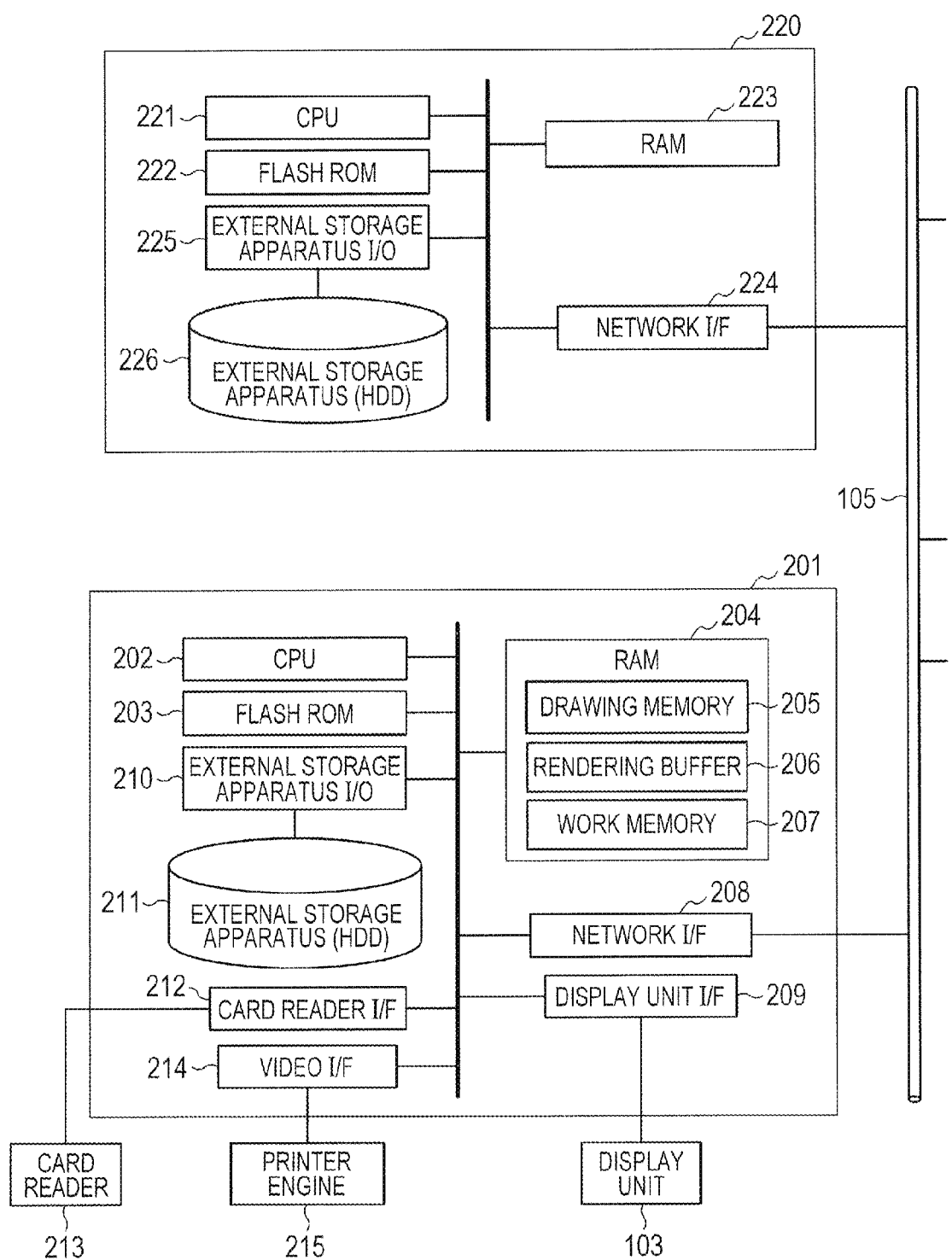
FIG. 2 is a diagram illustrating a main hardware configuration of each of an image output apparatus (bibliographic server) and a conversion server in a first embodiment.

FIG. 2 is a diagram illustrating an example of a main hardware configuration of each of the bibliographic server 102 and the conversion server 104 in the present embodiment. In FIG. 2, components 201 to 215 are included in the bibliographic server 102, and components 220 to 224 are included in the conversion server 104. The same components as the components in FIG. 1 are denoted by the same reference numerals, and description thereof is omitted.

First, the configuration of the bibliographic server 102 is described. A controller unit 201 is a board that performs overall control on the bibliographic server 102, and includes a CPU 202, a flash ROM 203, a RAM 204 and an external storage apparatus (hereinafter, referred to as "HDD") 211 that stores control programs and print data. Here, the CPU 202 loads an OS as part of control programs stored in the flash ROM 203 and other control programs stored in the HDD 211, to thereby perform processing according to procedures illustrated in flowcharts to be described later, whereby the CPU 202 performs the overall control on the bibliographic server 102. Note that the control programs are implemented by control units 301 to 312 illustrated in FIG. 3 to be described later.

The HDD 211 is connected to a bus of the controller unit 201 via an external storage apparatus I/O 210, and stores: resource data such as a font to which a PDL refers; and bibliographic information on a print job to be described later. A network I/F 208 controls transmission and reception of various pieces of data with respect to external apparatuses connected via a network 105.

Figure 3:
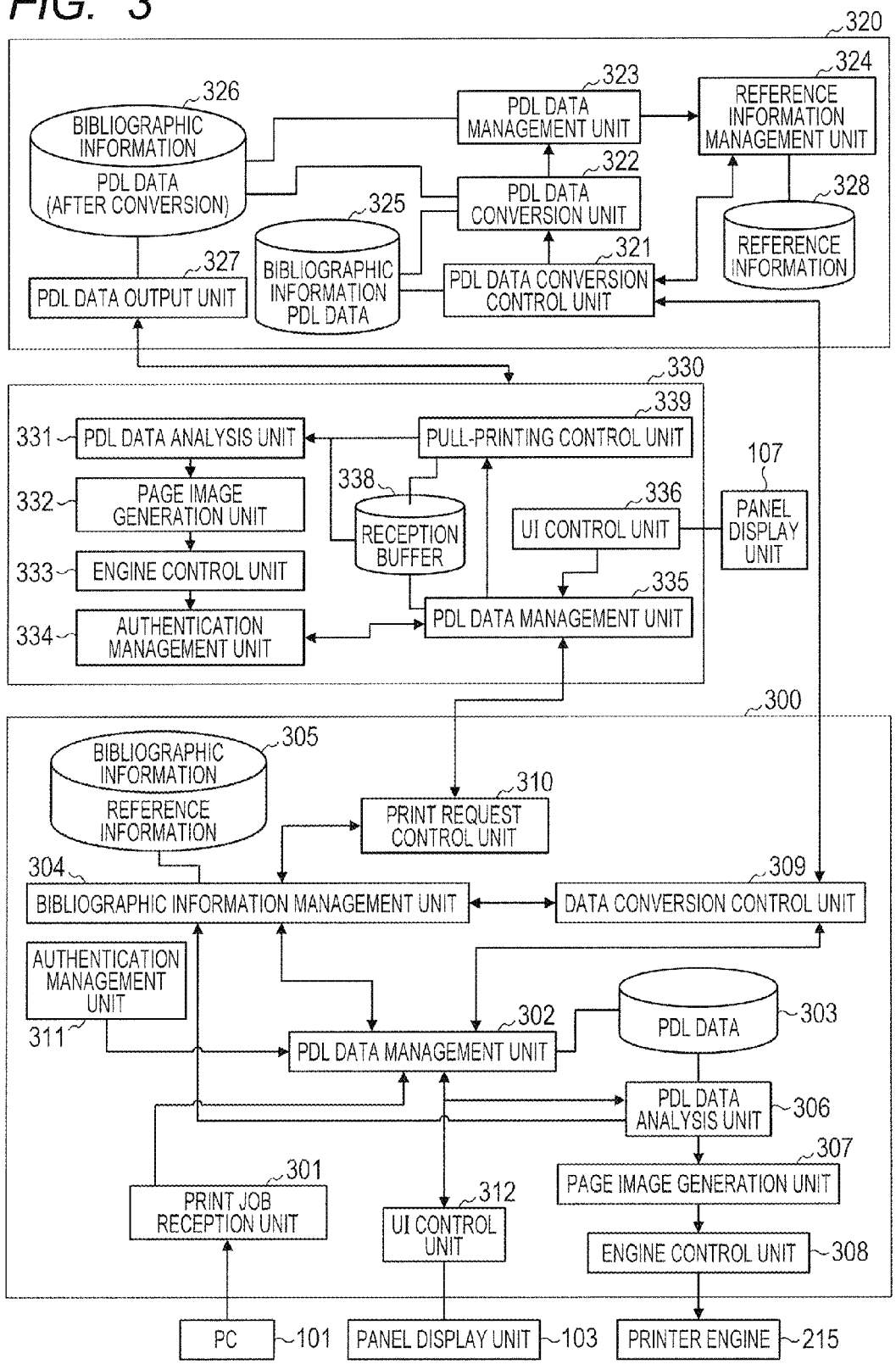
FIG. 3 is a diagram illustrating a configuration of a main control unit of each of the bibliographic server, an image output apparatus (client) and the conversion server in the first embodiment.

The RAM 204 is a volatile memory that is used by the CPU 202 to analyze PDL data. The RAM 204 includes: a drawing memory 205 that stores a drawing object generated by analyzing PDL data by a PDL data analysis unit 306 (FIG. 3); and a rendering buffer 206 that stores a page image generated by rendering a drawing object by a page image generation unit 307 (FIG. 3). The RAM 204 further includes a work memory 207 to be allocated as one of: a loading area of a control program that is loaded from the HDD 211 by the OS; and a heap area corresponding to a work area of the CPU 202.

A printer engine 215 is connected to the controller unit 201 via a video I/F 214, and forms a page image onto print paper according to known electrophotographic technology. Moreover, a card reader 213 is connected to the controller unit 201 via a card reader I/F 212, and the CPU 202 reads user information stored in a non-contact IC card, and compares the read user information with prestored user list information to thereby perform user authentication.

Next, the hardware configuration of the conversion server 104 is described. The conversion server 104 is similar to the bibliographic server 102 in that: a controller unit 220 is a board that performs overall control on the conversion server 104; and a CPU 221 loads and executes control programs to thereby perform the overall control. Accordingly, description of the CPU 221, a flash ROM 222, a network I/F 224 and an external storage apparatus I/O 225 is omitted. Note that the control programs are implemented by control units 320 to 328 illustrated in FIG. 3 to be described later.

The CPU 221 converts received print data in response to a request from the bibliographic server 102, and stores the converted print data in association with bibliographic information received together with the print job, into a HDD 226. Then, the CPU 221 generates reference information indicating the storage destination of the print data after conversion, stores the generated reference information in association with the bibliographic information, into the HDD 226, and outputs the bibliographic information as a response to the bibliographic server 102 as the request source. Here, a RAM 223 is used as a work area when the CPU 221 performs the conversion process. Note that the conversion process in the present embodiment includes converting chromatic color information on a drawing command included in PDL data constituting a print job, into achromatic information according to a predetermined color conversion process.

Next, operations of control units for implementing the control programs respectively executed by the CPUs of the bibliographic server 102, the client 106 and the conversion server 104 in the present embodiment are described with reference to in FIG. 3. FIG. 3 illustrates configurations of: control programs 300, 320 and 330 respectively included in the bibliographic server 102, the conversion server 104 and the client 106; and various pieces of data as management targets.

<Processing in Bibliographic Server 102>

First, in the bibliographic server 102, a print job reception unit 301 receives PDL data from the PC 101, and requests a PDL data management unit 302 to store the received PDL data. A PDL data storage unit 303 is a storage unit for storing the PDL data, and a partial partition of the HDD 211 is allocated as a storage area to the PDL data storage unit 303. In addition to the request to store the PDL data, the PDL data management unit 302 requests a bibliographic information management unit 304 to store bibliographic information. A bibliographic information storage unit 305 is a storage unit for storing the bibliographic information, and a partial partition of the HDD 211 is allocated as a storage area to the bibliographic information storage unit 305. Further, the PDL data management unit 302 requests a data conversion control unit 309 to perform a conversion process on the received PDL data, and the data conversion control unit 309 requests the conversion server 104 to perform a conversion process on the bibliographic information and the PDL data. Then, the data conversion control unit 309 requests the bibliographic information management unit 304 to: add reference information that is received as a response to the conversion process from the conversion server 104, to the bibliographic information on the print job as the conversion target; and store the resultant information.

Next, the case of performing printing using the bibliographic server 102 to which a user submits a print job is described. First, an authentication management unit 311 reads user information from the card reader (not illustrated), and requests the PDL data management unit 302 to acquire a list of received print jobs that match the user information. The PDL data management unit 302 requests the bibliographic information management unit 304 to acquire bibliographic information that matches the user information, and receives print job list information as a response thereto. Then, the PDL data management unit 302 requests a UI control unit 312 to display the print job list information.

The UI control unit 312 receives a print instruction on a print job selected by the panel display unit 103, and requests the PDL data management unit 302 to print the selected print job. Then, the PDL data management unit 302 requests the PDL data analysis unit 306 and the page image generation unit 307 to generate a page image, and an engine control unit 308 outputs the generated page image as a video signal to the printer engine 215, whereby a print process is executed. Here, the PDL data analysis unit 306 is a so-called PDL interpreter, and can interpret various PDLs such as Post-Script and PCL.

<Processing in Conversion Server 104>

A PDL data conversion control unit 321 receives a conversion process request from the data conversion control unit 309 (bibliographic server 102) to perform overall control on storage, conversion and response of bibliographic information and PDL data. The PDL data and the bibliographic information are stored in a storage unit 325. A PDL data conversion unit 322 receives a request from the PDL data conversion control unit 321 to convert chromatic color data included in the PDL data into grayscale, and requests a PDL data management unit 323 to store the converted PDL data. The PDL data management unit 323 stores the PDL data after conversion and the bibliographic information generated by the conversion process into a storage unit 326, and requests a reference information management unit 324 (reference information generation unit) to generate reference information as information for referring to the PDL data after conversion. The reference information management unit 324 stores the generated reference information in association with the bibliographic information into a reference information storage unit 328. After the conversion process is completed, the PDL data conversion control unit 321 (reference information transmission unit) transmits the reference information as a response to the bibliographic server 102, and deletes the PDL data before conversion. Note that a partial partition of the HDD 226 is allocated as each of the storage units 325, 326 and 328. Moreover, the details of the bibliographic information and the reference information are described later with reference to FIGS. 4A to 4C.

A PDL data output unit 327 receives a pull-printing request including reference information from the client 106, and checks whether or not PDL data (after conversion) identifiable using the reference information has already been stored. If the PDL data has already been stored, the PDL data output unit 327 reads the PDL data out of the storage unit 325 and outputs the PDL data to the client 106. Here, the PDL data output unit 327 compares the reference information included in the pull-printing request with the reference information stored in the storage unit 328, to thereby check whether or not the corresponding PDL data (after conversion) has already been stored.

<Print Process in Client 106>

The case where a print job submitted to the bibliographic server 102 is printed by the client 106 is described. First, a process in which an authentication management unit 334 requests a PDL data management unit 335 to acquire print job list information on an authenticated user and display the acquired print job list information on the panel display unit 107 is similar to the process in the bibliographic server 102, and hence description thereof is omitted. The PDL data management unit 335 of the client 106 requests the bibliographic server 102 to acquire the print job list information as bibliographic information.

A process in which a UI control unit 336 requests the PDL data management unit 335 to perform printing may be similar to the process in the bibliographic server 102. The client 106 is different from the bibliographic server 102 in that the PDL data management unit 335 requests the bibliographic server 102 to acquire a target print job while notifying the bibliographic server 102 of its own apparatus configuration information together with bibliographic information on the target print job. Note that the apparatus configuration information includes at least information indicating whether the client 106 is a color machine or a black and white machine.

In the bibliographic server 102 that has received a print request from the client 106, a print request control unit 310 outputs, as a response result, either of PDL data before conversion and reference information indicating the location of PDL data after conversion, based on the received apparatus configuration information and the received bibliographic information. That is, the print request control unit 310 functions as a print request response unit. Namely, in the case where it is determined from the apparatus configuration information that the client 106 is a color machine, the bibliographic information management unit 304 returns the storage location of the PDL data before conversion in response to a request from the print request control unit 310. On the other hand, in the case where it is determined from the apparatus configuration information that the client 106 is a black and white machine, the bibliographic information management unit 304 returns the corresponding reference information in response thereto. The PDL data management unit 335 of the client 106 analyzes the print job received as a response from the bibliographic server 102, and determines whether the received print job includes the PDL data as a print target or is the reference information.

In the case where the client 106 is a color machine, the print job includes the PDL data before conversion, and is processed as a normal print job. That is, the PDL data management unit 335 controls a process of receiving the PDL data via a reception buffer 338 and generating a page image from the received PDL data. Here, the process of generating the page image is similar to the process performed by the control units 306 to 308 (respectively corresponding to control units 331 to 333) of the bibliographic server 102.

On the other hand, in the case where the client 106 is a black and white machine, the PDL data management unit 335 receives the reference information written in a predetermined format, and acquires and prints the PDL data as a print target based on a reference URL included in the reference information. In the present embodiment, the reference URL includes an address for identifying the PDL data after conversion stored in the conversion server 104, and so-called pull-printing is performed using the reference URL. Here, a pull-printing control unit 339 controls the analysis of the reference information and the request and reception of the PDL data with respect to the reference URL, in response to a request from the PDL data management unit 335.

<Bibliographic Information and Reference Information>

Figure 4A:
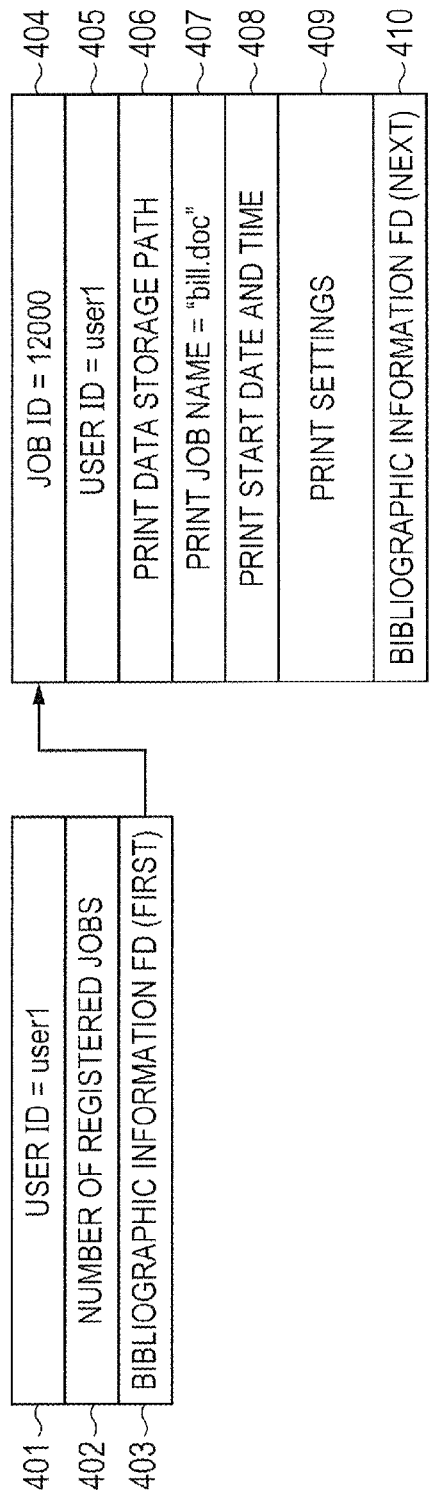
FIG. 4A is a diagram illustrating bibliographic information at the time of print job submission.

Configuration examples of the bibliographic information and the reference information are described with reference to FIGS. 4A to 4C. FIG. 4A illustrates bibliographic information immediately after a print job is submitted to the bibliographic server 102. In the present embodiment, bibliographic information is managed on a user information basis specified in a print job. That is, respective pieces of bibliographic information on print jobs are managed in the state where the pieces of bibliographic information are linked in the submission order to header information for managing the bibliographic information on a user basis.

As illustrated in FIG. 4A, the header information includes a user ID 401 for identifying a user, a number of registered jobs 402 indicating the total number of received print jobs, and bibliographic information FD (first) 403 for configuring a link to bibliographic information. Here, the bibliographic information FD (first) 403 refers to the descriptor of a file including stored first bibliographic information on a print job. In the case where no bibliographic information is stored, the initial value of the bibliographic information FD (first) 403 is −1.

Each piece of bibliographic information is formed by attribute information for managing and identifying the corresponding print job, and includes items 404 to 410 in FIG. 4A. The job ID 404 is for identifying the print job, and the PDL data management unit 302 allocates a unique value to the job ID 404 when the print job is submitted to the bibliographic server 102. The user ID 405 is generated from user information included in the print job, and, specifically, a user's login ID to a host PC is used as the user ID 405. The print data storage path 406 is an item for referring to PDL data stored in the PDL data storage unit 303, and is stored as a file, in which the directory path of the PDL data is written.

In addition to the above-mentioned items, the print job name 407, the print start date and time 408 and the print settings 409 are generated from information stored at the time of print job generation by the printer driver. In the present embodiment, the print settings 409 include set values concerning a color mode, layout print settings (the number of pages and direction for N-up printing), print side settings (both sides or one side) and finishing such as stapling, and part of the items are displayed as print job list information on the display unit 103 at the time of user authentication.

Lastly, the bibliographic information FD (next) 410 is a file descriptor for configuring a link to the next bibliographic information, and the initial value thereof is −1 similarly to the bibliographic information FD (first) 403. When print jobs of the same user are successively submitted, the bibliographic information FD (next) 410 is updated to the descriptor of a file including bibliographic information. These items are generated by the PDL data management unit 302 at the time of print job submission.

Note that, although a unidirectional link is adopted for bibliographic information connection in the present embodiment for ease of description, a bidirectional link may be adopted therefor for the purpose of simplifying sorting, deletion and insertion of a print job list. Moreover, although each piece of bibliographic information is assumed to have a predetermined size in the present embodiment, the print job name and the number of items for the print settings may be variable in practice.

Figure 4B:
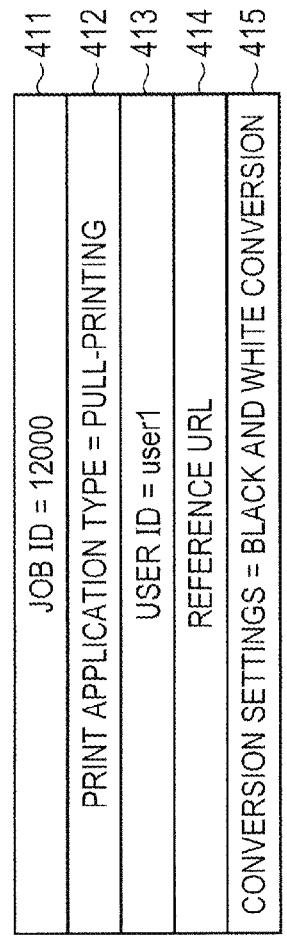
FIG. 4B is a diagram illustrating reference information generated by the conversion server.

Next, FIG. 4B illustrates a configuration example of the reference information generated by the conversion server 104. The reference information is generated in a format interpretable by the PDL data management unit 335 of the client 106. Moreover, the reference information includes information for referring to the PDL data after conversion generated by the conversion server 104. In FIG. 4B, a job ID 411 and a user ID 413 are equivalent to the job ID 404 and the user ID 405 in the bibliographic information, and hence description thereof is omitted. A reference URL 414 includes address information for identifying the PDL data after conversion stored in the conversion server 104.

A print application type 412 is an item representing a print mode, and a value indicating pull-printing is written in the print application type 412 in advance. In the pull-printing, the client 106 acquires PDL data with reference to the reference URL 414 to perform printing. In the pull-printing, for example, the client 106 acquires a print job using a known protocol such as Internet Printing Protocol (IPP). Note that the reference information management unit 324 generates a configuration in which a plurality of pieces of reference information is linked, from header information similar to header information for bibliographic information, and manages the reference information. Conversion settings 415 are an item indicating the print settings item used by the conversion server 104 for the conversion process, and a value indicating a process of converting PDL data into grayscale is written in the conversion settings 415 in the present embodiment.

Lastly, FIG. 4C illustrates a configuration example when the bibliographic server 102 couples the reference information received from the conversion server 104 to the bibliographic information and stores the coupled information as new bibliographic information. In the present embodiment, for the sake of simplicity, the bibliographic information before conversion is assumed to have a fixed size, and the bibliographic information management unit 304 can determine whether or not the conversion process by the conversion server 104 is completed, based on the size of a file including the bibliographic information.

<Processing Procedure in Bibliographic Server 102>

A processing procedure that is performed by the bibliographic server 102 at the time of print job submission and a print request from the client 106 is described with reference to flowcharts of FIG. 5 and FIG. 6. Steps described below are implemented by loading and executing the control program 300 on the CPU 202.

Figure 5:
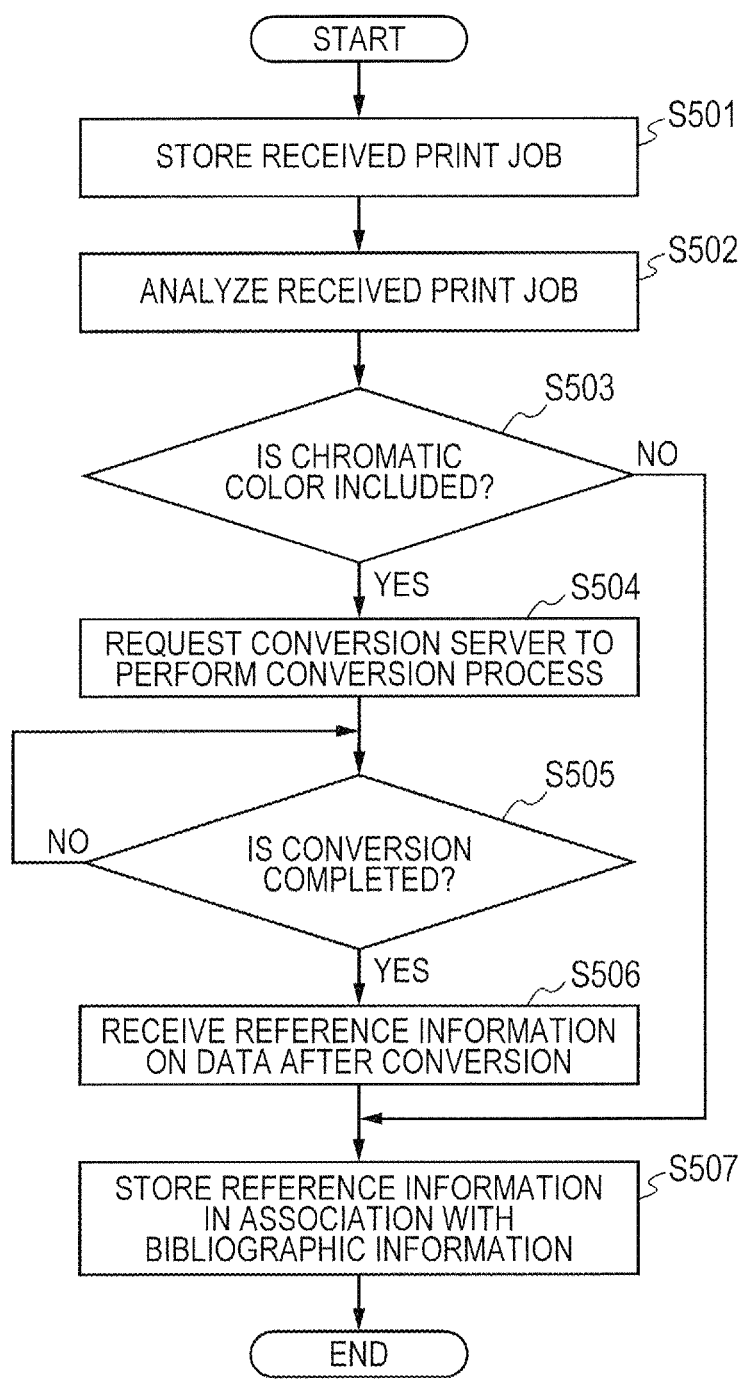
FIG. 5 is a flowchart illustrating a processing procedure that is performed by the bibliographic server at the time of print job submission.

First, in FIG. 5, in response to a request from the print job reception unit 301, the PDL data management unit 302 receives PDL data output from the PC 101 as a print job, and stores the received PDL data into the PDL data storage unit 303 (S501). Then, the PDL data management unit 302 analyzes the received PDL data (S502), and checks whether or not the PDL data is print data including a chromatic color (S503).

If it is determined in S503 that the PDL data includes a chromatic color, the data conversion control unit 309 requests the conversion server 104 to perform a conversion process on the PDL data (S504). The data conversion control unit 309 waits until a response is received from the conversion server 104 (N in determination in S505). As soon as the response is received, the data conversion control unit 309 receives reference information from the conversion server 104 (S506). Then, the bibliographic information management unit 304 receives a request from the data conversion control unit 309 to: couple the received reference information to bibliographic information having the same job ID; and store the coupled information into the bibliographic information storage unit 305 (S507). If it is determined in S503 that the PDL data does not include a chromatic color, the processing goes to S507.

Note that, although it is assumed in S503 that whether or not the PDL data includes a chromatic color is checked after every drawing command in the PDL data is examined, the printer driver may check in advance whether or not the PDL data includes a chromatic color, at the time of PDL data generation, and the check result may be added as chromatic color information to the print settings in the print job. According to this configuration, the need to examine every drawing command in the PDL data is eliminated, so that the processing load on the bibliographic server 102 can be further reduced.

Figure 6:
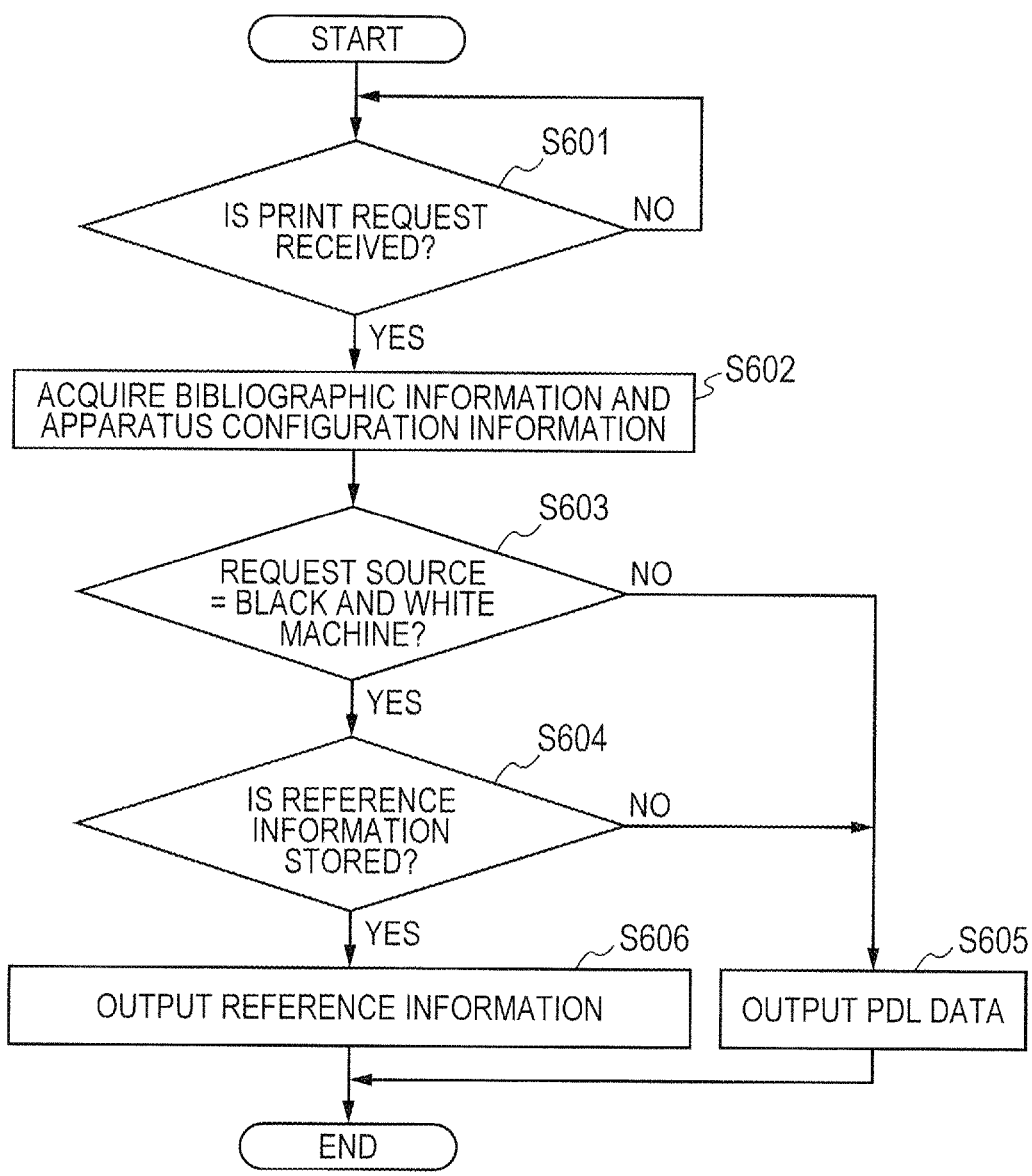
FIG. 6 is a flowchart illustrating a processing procedure that is performed by the bibliographic server at the time of a print request from the client.

Next, in FIG. 6, the print request control unit 310 checks whether or not a print request is received from the client 106, and waits until the print request is received (N in determination in S601). If the print request is received from the client 106, the print request control unit 310 acquires bibliographic information and apparatus configuration information included in the print request, and requests the bibliographic information management unit 304 to return position information on print data to be output as a response (S602).

The bibliographic information management unit 304 determines whether or not the client 106 is a black and white machine, based on the acquired apparatus configuration information. If it is determined that the client 106 is a color machine (N in determination in S603), the bibliographic information management unit 304 returns the print data storage path 406 in the bibliographic information. Then, the print request control unit 310 outputs PDL data stored in the storage location indicated by the print data storage path 406, to the client 106 (S605).

On the other hand, if it is determined that the client 106 is a black and white machine (Y in the determination in S603), the bibliographic information management unit 304 determines whether or not reference information (411 to 415) is stored together with the bibliographic information. If it is determined that the reference information (411 to 415) is stored (Y in determination in S604), the bibliographic information management unit 304 returns the storage location of the reference information to the print request control unit 310. Then, the print request control unit 310 outputs the reference information to the client 160 (S606). Note that, if the print request is received prior to the completion of the conversion process by the conversion server 104, the reference information is not stored (N in the determination in S604), and hence the processing goes to S605, in which PDL data before conversion is output.

<Job List Display>

Figure 7:
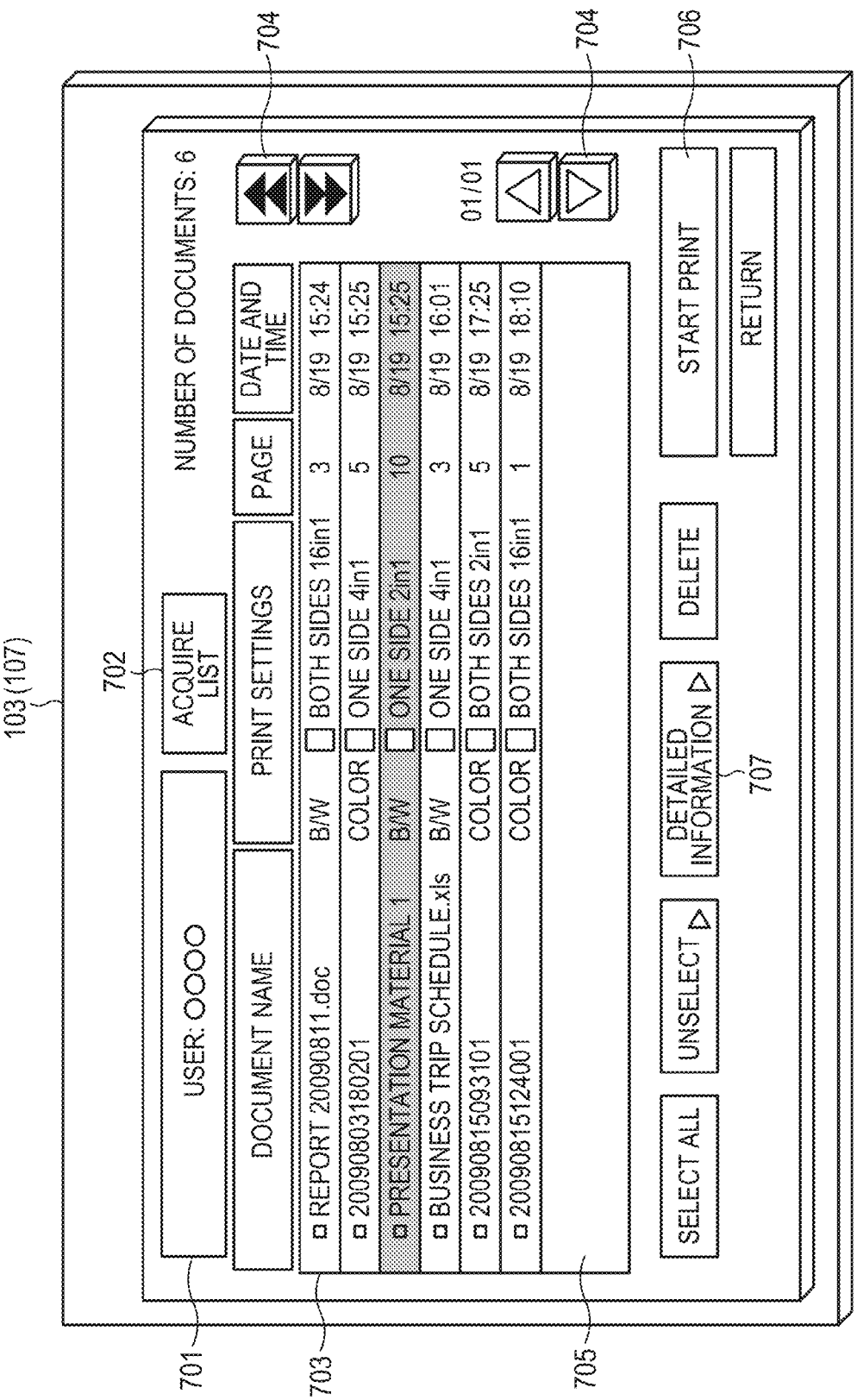
FIG. 7 illustrates an example in which a print job list is displayed on a display unit that also functions as an operation unit.

FIG. 7 illustrates an example in which the UI control unit 312 in the present embodiment displays a print job list on the display unit 103 of the bibliographic server 102. In this example, various buttons that enable the display unit 103 to also function as an operation unit are displayed. A user ID identified based on user information read by the card reader is displayed in a region 701. A button 702 is a list acquisition button, and the PDL data management unit 302 regenerates print job list information when the button 702 is pressed. For example, in the case where a user performs card authentication prior to the completion of storage of a print job submitted from the PC 101, print job list information can be updated by pressing the list acquisition button 702.

A print job list is displayed in a region 703. In this example, a list of print jobs submitted by the user is displayed together with print settings, based on bibliographic information acquired by the bibliographic information management unit 304. Specifically, the print job list includes the document name of each print job, print settings 705, the number of pages and submission date and time, and these items are displayed based on the print job name 407, the print settings information 409 and the print start date and time 408 included in the bibliographic information. Note that, although a color mode, print side settings (both sides or one side) and N-up settings are displayed as the print settings 705 in the present embodiment, the present invention is not particularly limited thereto.

A button 704 is a scroll button operable in the case where the print job list cannot fit within one screen. A button 706 is a print start button for giving an instruction to print a selected print job. A button 707 is a detailed information button for displaying detailed information on a print job on another screen.

Basic displayed items in the client 106 may be similar to the above-mentioned items, but the color mode is not included in the print settings 705 in the case where the client 106 is a black and white machine.

According to the above-mentioned processing, PDL data suitable for a black and white machine is generated in advance by the conversion server 104. Hence, even if the print settings of submitted PDL data are not suitable for the client, PDL data converted into an appropriate format can be received and processed.

Second Embodiment

In the first embodiment, the PDL data management unit 302 of the bibliographic server 102 determines whether or not the received PDL data includes a chromatic color, and determines whether or not to issue a conversion process request, according to the determination result. Hence, a conversion process may occur regardless of the complexity of the PDL data and the amount of data. Consequently, in an environment in which there are a large number of print jobs with a relatively low processing load including a chromatic color, a conversion process request is unnecessarily issued, so that the responsiveness of the entire system may become lower instead.

To deal with this, in the second embodiment, the content of data is analyzed at the time of print job submission, whether or not optimization is necessary is determined considering a processing load, and a conversion process request is issued to the conversion server 104 only in the case where a conversion process is determined to be necessary. Hence, the PDL data management unit 302 in the present embodiment examines the amount of image drawing commands with a high processing load of a color conversion process in image drawing, and determines whether or not to issue a conversion process request to the conversion server 104, according to the examination result.

Figure 8:
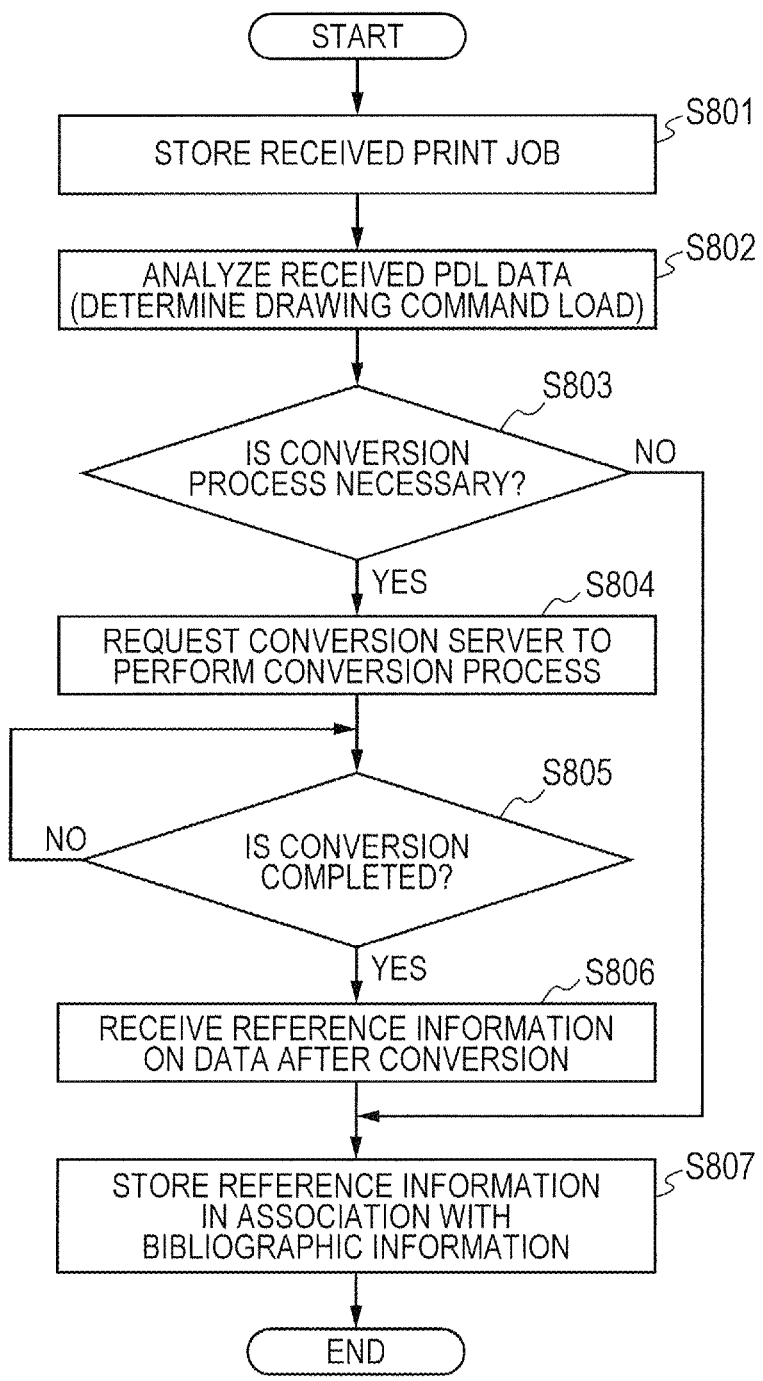
FIG. 8 is a flowchart illustrating a processing procedure that is performed by the bibliographic server at the time of print job submission in a second embodiment.

Hereinafter, a processing procedure that is performed by the bibliographic server 102 at the time of print job submission in the second embodiment is described with reference to a flowchart of FIG. 8. Note that, also in the present embodiment, steps described below are implemented by loading and executing the control program 300 on the CPU 202. Moreover, Steps S801 and S804 to S807 may be similar to Steps S501 and S504 to S507 in FIG. 5 in the first embodiment, and hence description thereof is omitted.

The present embodiment is different from the first embodiment in that, when received PDL data is analyzed in S802, the number and size of image drawing commands included in the PDL data are computed in addition to the determination as to whether or not the PDL data includes a chromatic color. In the first embodiment, if the PDL data is print data including a chromatic color, the conversion process is requested (Y in the determination in S503). In comparison, in the present embodiment, whether or not the computed value concerning the image drawing commands exceeds a predetermined threshold is also used for the determination in addition to whether or not the PDL data includes a chromatic color (S803). Specifically, because the time required for a color conversion process in image drawing is proportional to the number of pixels in image data before magnification conversion as a source, a value obtained by counting the number of pixels in image data including a chromatic color is used in the present embodiment.

According to the above-mentioned configuration, unnecessary issuing of a conversion process request concerning a print job with a low processing load is suppressed, and hence the responsiveness of the entire image output system can be more enhanced.

Note that, whether or not to issue a conversion process request may be determined based on not only the data tendencies of print jobs but also the configurations of authentication printing clients. For example, in the case where the configurations and use frequencies of clients in a network constituting authentication printing can be determined in advance, whether or not to issue a request to the conversion server may be determined considering the number of black and white machines and the use frequency of each black and white machine.

Third Embodiment

In the first and second embodiments, the conversion server 104 converts every chromatic color included in PDL data into grayscale. Alternatively, only a predetermined drawing command may be defined as a conversion target, considering the balance between the processing load on the conversion server 104 and the processing load on the client. For example, it is conceivable to define only image data with a high processing load of a decompression process and a color conversion process, as a conversion target.

Moreover, a process of converting the compression format of image data into a format suitable for grayscale may be performed together with a color conversion process. For example, a lossy compression format such as JPEG may be applied to image data including a natural picture in order to reduce the data size, and JPEG compression requires many CPU resources for a decompression process such as DCT conversion, so that hardware for decompression needs to be provided. A black and white machine however may not be provided with special hardware for decompression, because a printer driver on a PC generates data converted into grayscale. Accordingly, in the case of such a configuration, compression formats such as PackBits and DeltaRow are applied after image data conversion into grayscale, whereby the processing load on the client can be made further lower while the processing load on the conversion server itself can also be made lower.

Figure 9:
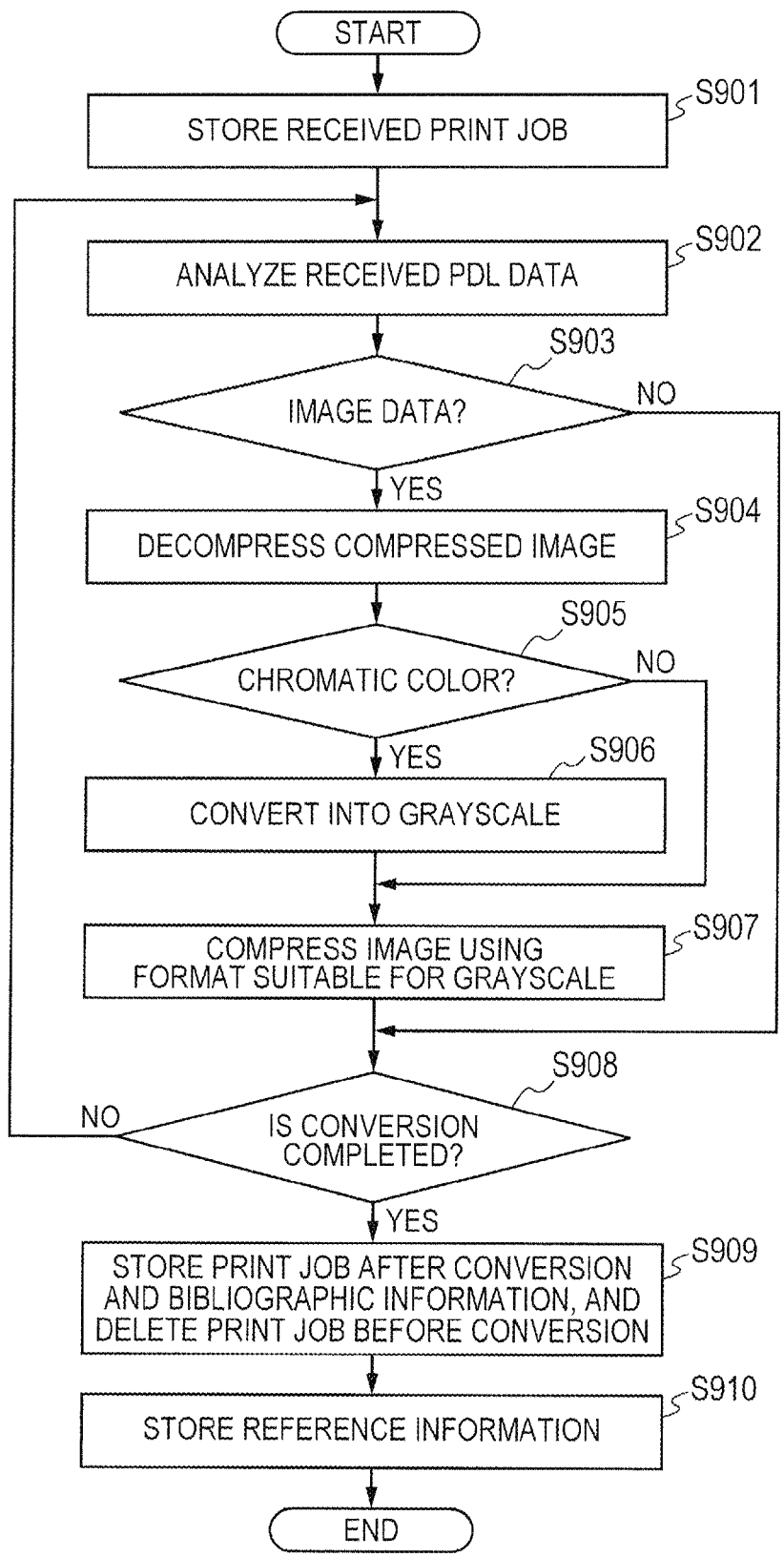
FIG. 9 is a flowchart illustrating a conversion procedure that is performed by the conversion server in a third embodiment.

FIG. 9 illustrates a processing procedure performed by the conversion server 104 in the third embodiment. First, the PDL data conversion control unit 321 stores a print job and bibliographic information received from the bibliographic server 102 into the storage unit 325 (S901), and requests the PDL data conversion unit 322 to analyze the received PDL data (S902). The PDL data conversion unit 322 checks whether or not the PDL data includes a drawing command for drawing image data (S903). If the PDL data is not image data, the PDL data conversion unit 322 skips a conversion process and goes to S908 for a conversion process on the next drawing command. That is, with regard to brushes applied to characters and graphics, even if chromatic colors are specified, color conversion is not performed by the conversion server 104.

On the other hand, if the PDL data is image data (Y in determination in S903), the image data is decompressed, color-converted and compressed in the subsequent steps. First, the PDL data conversion unit 322 decompresses the compressed image data according to a predetermined procedure (S904), and checks whether or not any of pixels constituting the image data includes a chromatic color (S905). If the image data includes a chromatic color, the PDL data conversion unit 322 converts the color value of each pixel constituting the image data into grayscale (S906), and compresses the image data after conversion using a compression format suitable for the grayscale (S907). On the other hand, if the image data does not include a chromatic color (N in determination in S905), the image data is one of a grayscale image and a binary image, and hence the PDL data conversion unit 322 performs the compression process in S907 without performing the color conversion process.

The PDL data conversion unit 322 performs Steps S902 to S907 on every print job. After the conversion process on every print job is completed (Y in determination in S908), the PDL data management unit 323 and the reference information management unit 324 store the print data after conversion and the reference information (S909 and S910). In addition, the PDL data conversion control unit 321 deletes the PDL data before conversion and the bibliographic information stored in the storage unit 325. Note that these processes are similar to the processes in the procedure described in the first embodiment, and hence description thereof is omitted.

Fourth Embodiment

In the first to third embodiments, whether to output the PDL data before conversion or the reference information is determined based on whether or not the apparatus configuration information received from the client 106 indicates a black and white machine. In addition to this, the color mode in the print settings included in the bibliographic information may also be considered.

The bibliographic information management unit 304 illustrated in the fourth embodiment outputs the reference information not only in the case where the client 106 is determined to be a black and white machine based on the apparatus configuration information received from the print request control unit 310 but also in the case where the color mode in the print settings 409 included in the bibliographic information is set to black and white output.

According to such a configuration, in the case where the color mode is changed to black and white output through one of a panel operation on the client 106 that is a color machine and a panel operation on the bibliographic server 102, printing can be performed using PDL data that is converted in advance into grayscale by the conversion server 104. Accordingly, the need to perform a color conversion process at the time of printing is eliminated. As a result, also in the case of a color machine, an authentication printing environment in which the load of a color conversion process is reduced and a decrease in speed is suppressed can be provided.

According to the present invention, even in the case where a black and white machine is selected as an image output apparatus, PDL data in a suitable format is generated in advance at the time of submission from a PC. Hence, an authentication printing environment in which the responsiveness from a print request to the print start is high and the comfort is not impaired can be provided.

Moreover, a conversion process on PDL data is performed prior to a print request from an image output apparatus. Hence, the load of a PDL data analysis process by the image output apparatus can be reduced, and processing throughput after the print start can be enhanced.

Further, a conversion process on PDL data and a response process on a request to hold/output print data after conversion are performed by an external apparatus different from an authentication printing server, whereby load concentration on the authentication printing server can be avoided even in an environment in which a large number of PCs and image output apparatuses are connected. Hence, an authentication printing environment in which the responsiveness does not become lower can be provided.

Still further, even in an environment mixedly including image output apparatuses having different apparatus capabilities, an easy-to-use authentication printing system can be provided. Moreover, even in the case where the print settings can be changed to color output after submission with the color mode being set to black and white output, the load of a color conversion process on a black and white machine does not need to be increased, and printing with suppressed performance degradation can be performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-079997, filed Apr. 9, 2015, which is hereby incorporated by reference herein in its entirety.

What is claimed is:

1. An image output system in which an image processing apparatus, an image output apparatus and a conversion server for data conversion are connected to one another via a network,
wherein the image processing apparatus comprises:
a storage unit configured to store print data received from an external apparatus via the network; and
a conversion control unit configured to request the conversion server to perform a conversion process on the print data,
wherein the conversion server comprises:
a conversion unit configured to perform a conversion process of converting the print data into a predetermined format in response to the request from the image processing apparatus;
a reference information generation unit configured to generate reference information indicating a location of the print data after conversion by the conversion unit; and
a reference information transmission unit configured to transmit the reference information to the image processing apparatus as a response to the request from the image processing apparatus,
wherein the image output apparatus comprises:
a print data request unit configured to notify the image processing apparatus of apparatus configuration information on the image output apparatus and issue a print data request to the image processing apparatus; and
a print unit configured to perform a print process,
wherein the image processing apparatus further comprises a print data request response unit configured to select either of the print data stored in the storage unit and the reference information received from the conversion server based on the apparatus configuration information, and output a selection result to the image output apparatus as a response to the print data request from the image output apparatus, and
wherein in the image output apparatus, when the reference information is received from the image processing apparatus, the print unit acquires the print data after conversion by the conversion unit from the conversion server and performs printing, based on the reference information, and, when the print data is received from the image processing apparatus, the print unit performs printing based on the print data.

2. The image output system according to claim 1,
wherein the print data received from the external apparatus includes PDL data, and
wherein the conversion process by the conversion unit of the conversion server includes a process of interpreting drawing commands included in the PDL data and color-converting a drawing command including a chromatic color into a drawing command generated in grayscale.

3. The image output system according to claim 1,
wherein the print data received from the external apparatus includes PDL data, and
wherein the conversion server determines whether or not to perform the conversion process, according to one of complexity of drawing commands included in the PDL data and an amount of load of the conversion process.

4. The image output system according to claim 1,
wherein the print data received from the external apparatus includes PDL data, and
wherein the conversion server interprets drawing commands included in the PDL data and performs the conversion process on only a predetermined drawing command.

5. The image output system according to claim 1,
wherein the conversion control unit of the image processing apparatus determines whether or not to request the conversion process, from the apparatus configuration information and print settings of the print data.

6. The image output system according to claim 1, wherein the print data received from the external apparatus includes PDL data, and
wherein the image processing apparatus further comprises:

an operation unit configured to receive a user's operation;
an authentication management unit configured to perform authentication based on user information obtained;
a bibliographic information management unit configured to add user information included in the print data to bibliographic information on the print data and manage the resultant bibliographic information; and
a PDL data management unit configured to output PDL data that matches the user information to the image output apparatus in response to a print instruction from the operation unit, and
the print data request response unit configured to output PDL data that matches the user information to the image output apparatus in response to the print data request from the image output apparatus.

7. The image output system according to claim 1, wherein the image processing apparatus further has a function as an image output apparatus.

8. The image output system according to claim 1, wherein the external apparatus is a print data generation apparatus.

9. The image output system according to claim 1, wherein in a case where the print data received from the external apparatus includes a chromatic color, the conversion control unit of the image processing apparatus requests the conversion server to perform a conversion process of converting the print data into print data including no chromatic color,
where in a case where the print data request from the image output apparatus is a request to print print data including a chromatic color, the print data request response unit of the image processing apparatus outputs the print data stored in the storage unit to the image output apparatus, and
wherein in a case where the print data request from the image output apparatus is a request to print print data including no chromatic color, the print data request response unit of the image processing apparatus outputs the reference information received from the conversion server to the image output apparatus.

10. An image processing apparatus connectable to an image output apparatus and a conversion server for data conversion via a network, the image processing apparatus comprising:
a storage unit configured to store print data received from an external apparatus via the network;
a conversion control unit configured to request the conversion server to perform a conversion process on the print data;
a first reception unit configured to receive, from the conversion server, reference information indicating a location of the print data after conversion into a predetermined format as a response to the request;
a second reception unit configured to receive, from the image output apparatus, apparatus configuration information on the image output apparatus and a print data request; and
a print data request response unit configured to select either of the print data stored in the storage unit and the reference information received from the conversion server based on the apparatus configuration information, and output a selection result to the image output apparatus as a response to the print data request from the image output apparatus.

11. The image processing apparatus according to claim 10,
wherein the print data received from the external apparatus includes PDL data, and
wherein the conversion process requested of the conversion server includes a process of interpreting drawing commands included in the PDL data and color-converting a drawing command including a chromatic color into a drawing command generated in grayscale.

12. The image processing apparatus according to claim 10,
wherein the print data received from the external apparatus includes PDL data, and
wherein the conversion process requested of the conversion server includes a process of determining whether or not to perform the conversion process, according to one of complexity of drawing commands included in the PDL data and an amount of load of the conversion process.

13. The image processing apparatus according to claim 10,
wherein the print data received from the external apparatus includes PDL data, and
wherein the conversion process requested of the conversion server includes a process of interpreting drawing commands included in the PDL data and converting only a predetermined drawing command.

14. The image processing apparatus according to claim 10, wherein the conversion control unit determines whether or not to request the conversion process, from the apparatus configuration information and print settings of the print data.

15. The image processing apparatus according to claim 10,
wherein the print data received from the external apparatus includes PDL data, and
wherein the image processing apparatus further comprises:
an operation unit configured to receive a user's operation;
an authentication management unit configured to perform authentication based on user information obtained;
a bibliographic information management unit configured to add user information included in the print data to bibliographic information on the print data and manage a resultant bibliographic information; and
a PDL data management unit configured to output PDL data that matches the user information to the image output apparatus in response to a print instruction from the operation unit, and
the print data request response unit configured to output PDL data that matches the user information to the image output apparatus in response to the print data request from the image output apparatus.

16. The image processing apparatus according to claim 10, further having a function as an image output apparatus.

17. The image processing apparatus according to claim 10, wherein the external apparatus is a print data generation apparatus.

18. The image processing apparatus according to claim 10,
wherein in a case where the print data received from the external apparatus includes a chromatic color, the conversion control unit requests the conversion server to perform a conversion process of converting the print data into print data including no chromatic color,
wherein in a case where the print data request from the image output apparatus is a request to print print data including a chromatic color, the print data request response unit outputs the print data stored in the storage unit to the image output apparatus, and wherein in a case where the print data request from the image output apparatus is a request to print print data including no chromatic color, the print data request response unit outputs the reference information received from the conversion server to the image output apparatus.

19. An image output apparatus connectable to an image processing apparatus and a conversion server for data conversion via a network, the image output apparatus comprising:
a print data request unit configured to notify the image processing apparatus of apparatus configuration information on the image output apparatus and issue a print data request to the image processing apparatus to print print data received and stored by the image processing apparatus from an external apparatus via the network;
a reception unit configured to receive, as a response to the print data request, from the image processing apparatus, either of (a) the print data received and stored by the image processing apparatus, and (b) reference information indicating a location of the print data after conversion into a predetermined format by the conversion server in response to a request from the image processing apparatus, the either of the print data and the reference information being selected by the image processing apparatus based on the apparatus configuration information; and
a print unit configured to, when the reception unit receives the reference information, acquire the print data after conversion from the conversion server and perform printing, based on the reference information, and, when the reception unit receives the print data, perform printing based on the print data.

20. The image output apparatus according to claim 19, wherein the print data received from the external apparatus includes PDL data.

21. The image output apparatus according to claim 19, wherein the external apparatus is a print data generation apparatus.

22. The image output apparatus according to claim 19, wherein in a case where the print data received from the external apparatus includes a chromatic color, the image processing apparatus requests the conversion server to perform a conversion process of converting the print data into print data including no chromatic color,
wherein in a case where the print data request unit issues a request to print print data including a chromatic color, the reception unit receives the print data received and stored by the image processing apparatus, and
wherein in a case where the print data request unit issues a request to print print data including no chromatic color, the reception unit receives the reference information.

23. An image output method carried out in an image output system in which an image processing apparatus, an image output apparatus and a conversion server for data conversion are connected to one another via a network, the image output method comprising:
storing, in the image processing apparatus, print data received from an external apparatus via the network;
requesting, in the image processing apparatus, the conversion server to perform a conversion process on the print data;
performing, in the conversion server, a conversion process of converting the print data into a predetermined format in response to the request from the image processing apparatus;
generating, in the conversion server, reference information indicating a location of converted print data which is obtained by performing the performed conversion process;
transmitting, in the conversion server, the generated reference information to the image processing apparatus as a response to the request from the image processing apparatus;
in the image output apparatus, notifying the image processing apparatus of apparatus configuration information on the image output apparatus and issuing a print data request to the image processing apparatus; outputting, in the image processing apparatus, either of the stored print data and the reference information received from the conversion server, based on the notified apparatus configuration information, to the image output apparatus as a response to the issued print data request; and
in the image output apparatus, when the reference information is received from the image processing apparatus, acquiring the converted print data and performing printing, based on the reference information, and, when the print data is received from the image processing apparatus, performing printing based on the received print data.

24. An image processing method carried out in an image processing apparatus connectable to an image output apparatus and a conversion server for data conversion via a network, the image processing method comprising:
storing print data received from an external apparatus via the network;
requesting the conversion server to perform a conversion process on the print data;
receiving, from the conversion server, reference information indicating a location of the print data after conversion into a predetermined format as a response to the request;
receiving, from the image output apparatus, apparatus configuration information on the image output apparatus and a print data request; and
selecting either of the stored print data and the received reference information, based on the received apparatus configuration information, and outputting a selection result to the image output apparatus as a response to the received print data request.

25. An image output method carried out in an image output apparatus connectable to an image processing apparatus and a conversion server for data conversion via a network, the image output method comprising:
notifying the image processing apparatus of apparatus configuration information on the image output apparatus and issuing a print data request to the image processing apparatus to print print data received and stored by the image processing apparatus from an external apparatus via the network;
receiving, as a response to the print data request, from the image processing apparatus, either of (a) the print data received and stored by the image processing apparatus, and (b) reference information indicating a location of the print data after conversion into a predetermined format by the conversion server in response to a request from the image processing apparatus, the either of the print data and the reference information being selected in the image processing apparatus based on the apparatus configuration information; and when the receiving receives the reference information, acquiring the print data after conversion from the conversion server and performing printing, based on the reference information, and, when the receiving receives the print data, performing printing based on the received print data.

26. A non-transitory, computer-readable storage medium storing a program that causes a computer to execute a processing, the computer serving as an image processing apparatus connectable to an image output apparatus and a conversion server for data conversion via a network, the processing comprising:
  storing print data received from an external apparatus via the network; requesting the conversion server to perform a conversion process on the print data;
  receiving, from the conversion server, reference information indicating a location of the print data after conversion into a predetermined format as a response to the request;
  receiving, from the image output apparatus, apparatus configuration information on the image output apparatus and a print data request; and
  selecting either of the stored print data and the received reference information, based on the received apparatus configuration information, and outputting a selection result to the image output apparatus as a response to the received print data request.

27. A non-transitory, computer-readable storage medium storing a program that causes a computer to execute a processing, the computer serving as an image output apparatus connectable to an image processing apparatus and a conversion server for data conversion via a network, the processing comprising:
  notifying the image processing apparatus of apparatus configuration information on the image output apparatus;
  issuing a print data request to the image processing apparatus to print print data received and stored by the image processing apparatus from an external apparatus via the network;
  receiving, as a response to the issued print data request, from the image processing apparatus, either of (a) the print data received and stored by the image processing apparatus, and (b) reference information indicating a location of the print data after conversion into a predetermined format by the conversion server in response to a request from the image processing apparatus, the either of the print data and the reference information being selected in the image processing apparatus based on the apparatus configuration information; and
  when the receiving receives the reference information, acquiring the print data after conversion from the conversion server and performing printing, based on the reference information, and, when the receiving receives the print data, performing printing based on the received print data.

* * * * *